(12) United States Patent
Komatsubara et al.

(10) Patent No.: US 10,618,402 B2
(45) Date of Patent: Apr. 14, 2020

(54) GRILLE SHUTTER DEVICE

(71) Applicants: AISIN SEIKI KABUSHIKI KAISHA, Kariya-shi (JP); TOYOTA JIDOSHA KABUSHIKI KAISHA, Toyota-shi (JP)

(72) Inventors: Ken Komatsubara, Nagoya (JP); Hideo Nishioka, Toyota (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/123,575

(22) Filed: Sep. 6, 2018

(65) Prior Publication Data

US 2019/0084409 A1 Mar. 21, 2019

(30) Foreign Application Priority Data

Sep. 15, 2017 (JP) .................. 2017-178031

(51) Int. Cl.
*B60K 11/08* (2006.01)
*F24F 13/14* (2006.01)
*F24F 11/37* (2018.01)

(52) U.S. Cl.
CPC ............ *B60K 11/085* (2013.01); *F24F 11/37* (2018.01); *F24F 13/14* (2013.01); *F24F 13/1413* (2013.01)

(58) Field of Classification Search
CPC ..... B60K 11/085; F24F 11/37; F24F 13/1413; F24F 13/14
See application file for complete search history.

(56) References Cited

U.S. PATENT DOCUMENTS

2014/0335778 A1* 11/2014 Takanaga .................. F24F 7/00 454/333

FOREIGN PATENT DOCUMENTS

JP 5803976 B2 11/2015

\* cited by examiner

*Primary Examiner* — Jacob M Amick
*Assistant Examiner* — Charles Brauch
(74) *Attorney, Agent, or Firm* — Oblon, McClelland, Maier & Neustadt, L.L.P (57) ABSTRACT

A grille shutter device including: a plurality of fins; a linkage member configured to link the fins such that the fins move together; a driving device configured to move one of the fins; an abnormality detection unit configured to detect an abnormality of the fin according to an operating state of the driving device; and a locking structure including a first locking portion being a part of each of the fins and a second locking portion being a part of the linkage member, wherein: in a motive power transmission cut-off state, a movement of the linkage member is restricted by an abutment of the second locking portion against a first locking portion of an abnormal fin.

4 Claims, 8 Drawing Sheets

GRILLE SHUTTER DEVICE

INCORPORATION BY REFERENCE

The disclosure of Japanese Patent Application No. 2017-178031 filed on Sep. 15, 2017 including the specification, drawings and abstract is incorporated herein by reference in its entirety.

BACKGROUND

1. Technical Field

The disclosure relates to a grille shutter device.

2. Description of Related Art

A grille shutter device described in Japanese Patent No. 5803976 (JP 5803976 B) includes a plurality of fins that respectively turn around the horizontal turning center axes to open and close an outside air introduction path in front of shafts of the fins, a linkage member that links the fins together, a motor that turns the fins through the linkage member, and a control unit that controls the driving of the motor. The fins are arranged vertically in parallel to each other. The fins are each provided with a turn restriction portion. The fins and the linkage member are turnably coupled together by operation pins. When motive power transmission between the fin and the linkage member is cut off for some reason, the turn restriction portions of the fin of which the motive power is cut off and the fin adjacent thereto interfere with each other so that turning of the fins is restricted. As a result, the load of the motor increases and thus the current value of the motor increases. The control unit detects an abnormality of the fin by detection of the current value that is greater than a predetermined value.

SUMMARY

In the grille shutter device described above, when motive power transmission between one of the fins and the linkage member is cut off in a fully closed state, the turn restriction portions of the fin of which the motive power is cut off and the fin upwardly adjacent thereto interfere with each other. On the other hand, when motive power transmission between one of the fins and the linkage member is cut off in a fully open state, the turn restriction portions of the fin of which the motive power is cut off and the fin downwardly adjacent thereto interfere with each other.

However, in the above-described grille shutter device, there is no fin that is upwardly adjacent to the uppermost fin, and there is no fin that is downwardly adjacent to the lowermost fin. Therefore, when motive power transmission between the uppermost fin and the linkage member is cut off while the uppermost fin is in the fully closed state, the turn restriction portions of the uppermost fin and the fin adjacent thereto do not interfere with each other. Moreover, when motive power transmission between the lowermost fin and the linkage member is cut off while the lowermost fin is in the fully open state, the turn restriction portions of the lowermost fin and the fin adjacent thereto do not interfere with each other. Therefore, there is a possibility that an abnormality of the uppermost fin or the lowermost fin cannot be detected.

The disclosure provides a grille shutter device that can detect an abnormality of a fin more properly.

An aspect of the present disclosure relates to grille shutter device including: a plurality of fins configured to open and close an air introduction path which is configured to introduce air into an engine compartment of a vehicle body; a linkage member configured to link the fins such that the fins move together; a driving device configured to move one of the fins to open and close the air introduction path; an abnormality detection unit configured to detect an abnormality of the fin according to an operating state of the driving device; and a locking structure including a first locking portion being a part of each of the fins and a second locking portion being a part of the linkage member, wherein: in a motive power transmission cut-off state, a movement of the linkage member is restricted by an abutment of the second locking portion against a first locking portion of an abnormal fin; the motive power transmission cut-off state is a state where motive power transmission between the abnormal fin and the linkage member is cut off due to the abnormality which occurs on at least one of the fins; and the abnormal fin is the fin on which the abnormality occurs.

For example, when the fins cannot move due to an abnormality, such as fixation of the fin, if an attempt is made to move the fins and the linkage member together by the driving device, there is a possibility that motive power transmission between the fin subjected to the abnormality and the linkage member is cut off.

In this regard, according to the above-described configuration, when motive power transmission between the fin subjected to the abnormality and the linkage member is cut off, the movements of the fins and the linkage member are restricted by the locking structure such that the locking portion of the fin subjected to the abnormality and the locking portion of the linkage member abut against each other. As a result, the operation of the driving device is restricted so that the abnormality of the fin can be detected by the abnormality detection unit. Therefore, it is possible to detect the abnormality of the fin more properly.

According to a grille shutter device of the disclosure, it is possible to detect an abnormality of a fin more properly.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a first embodiment of a grille shutter device will be described. In a vehicle 1 shown in FIG. 1, an engine 4, a radiator 5 for cooling the engine 4, and a fan 6 are disposed in an engine compartment 3 formed inside a vehicle body 2. A grille opening 7 that allows communication between the outside space in front of the vehicle 1 and the engine compartment 3 of the vehicle body 2 is formed in the front part (left end portion in FIG. 1) of the vehicle body 2. The radiator 5 is disposed in front of the engine 4 so that the air flowing into the engine compartment 3 through the grille opening 7 hits the radiator 5. The fan 6 is provided between the engine 4 and the radiator 5. By driving the fan 6, the air is efficiently supplied to the radiator 5. Further, a grille shutter device 10 is disposed in the engine compartment 3. The grille shutter device 10 is provided between the grille opening 7 and the radiator 5. The grille shutter device 10 opens and closes an air introduction path R configured to introduce the air flowing through the grille opening 7 into the engine compartment 3, thereby controlling the flow rate of the air that flows into the engine compartment 3.

Figure 1:
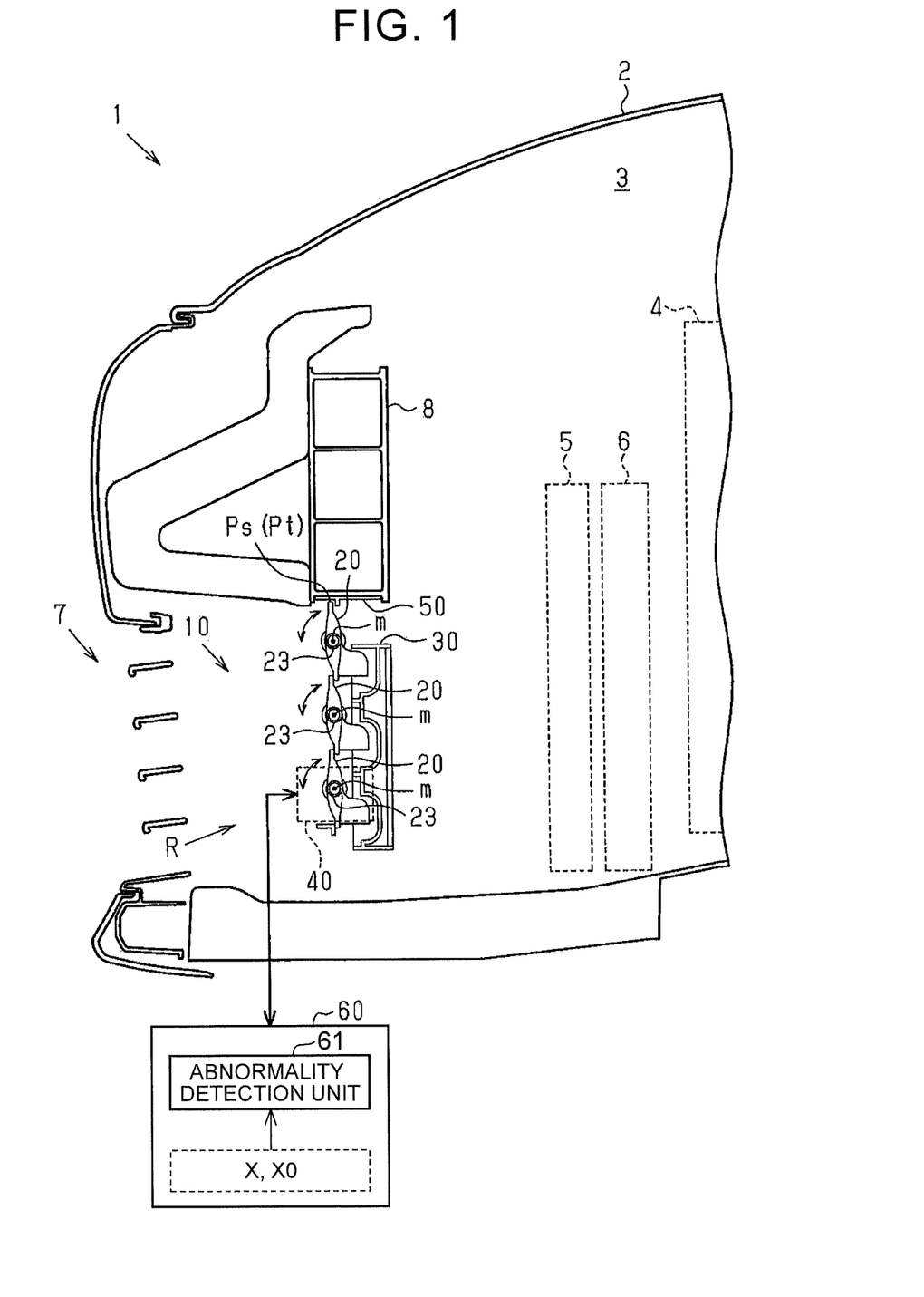
FIG. 1 is a schematic structural diagram of a vehicle equipped with a grille shutter device.

The grille shutter device 10 includes a plurality of fins 20, a link 30 as a linkage member, an actuator 40 as a driving device, a frame 50, and a control unit 60. The frame 50 has an upper end portion fixed to a bumper reinforce 8 provided inside the vehicle body 2.

Figure 4:
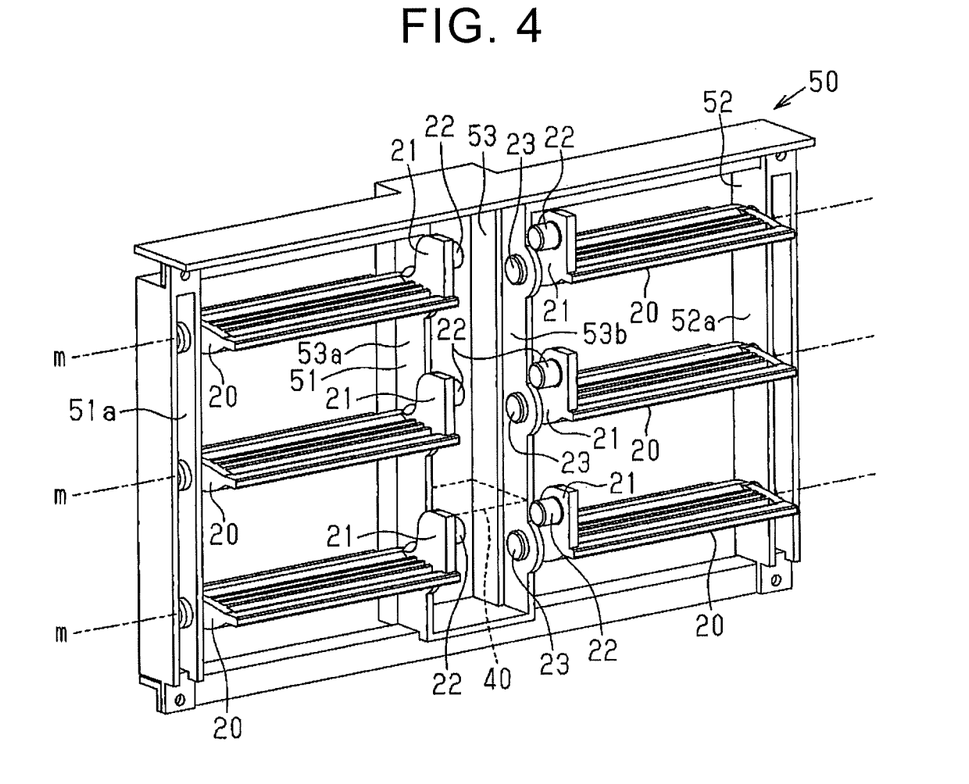
FIG. 4 is a schematic configuration diagram of a frame and the fins.

As shown in FIG. 4, the frame 50 has a rectangular frame shape. The frame 50 has a central support portion 53. The central support portion 53 is coupled between a middle portion of an upper wall of the frame 50 and a middle portion of a lower wall of the frame 50. Two openings 51, 52 are defined by providing the central support portion 53. The central support portion 53 has a box shape. The central support portion 53 is open toward the vehicle rear side.

The fins 20 each have a plate shape. The fins 20 are respectively supported so as to be able to rotate integrally with rotary shafts 23 each of which is provided so as to cross a corresponding one of the openings 51, 52 in the right-left direction in FIG. 4. In the opening 51, the rotary shafts 23 are rotatably coupled between a left wall portion 53a of the central support portion 53 and a left wall portion 51a of the frame 50. In the opening 52, the rotary shafts 23 are rotatably coupled between a right wall portion 53b of the central support portion 53 and a right wall portion 52a of the frame 50. That is, the fins 20 are each turnable around the axis m of the rotary shaft 23 relative to the frame 50. The fins 20 are arranged in parallel to each other along a direction (vertical direction in FIG. 4) perpendicular to the axes m. The three fins 20 provided in the opening 51 and the three fins 20 provided in the opening 52 are mirror symmetrical to each other with respect to the central support portion 53. The fins 20 respectively turn around the axes m of the rotary shafts 23, thereby opening and closing the openings 51, 52 of the frame 50 (to be exact, the air introduction path R). The fins 20 each turn between a fully open position and a fully closed position.

Figure 3A:
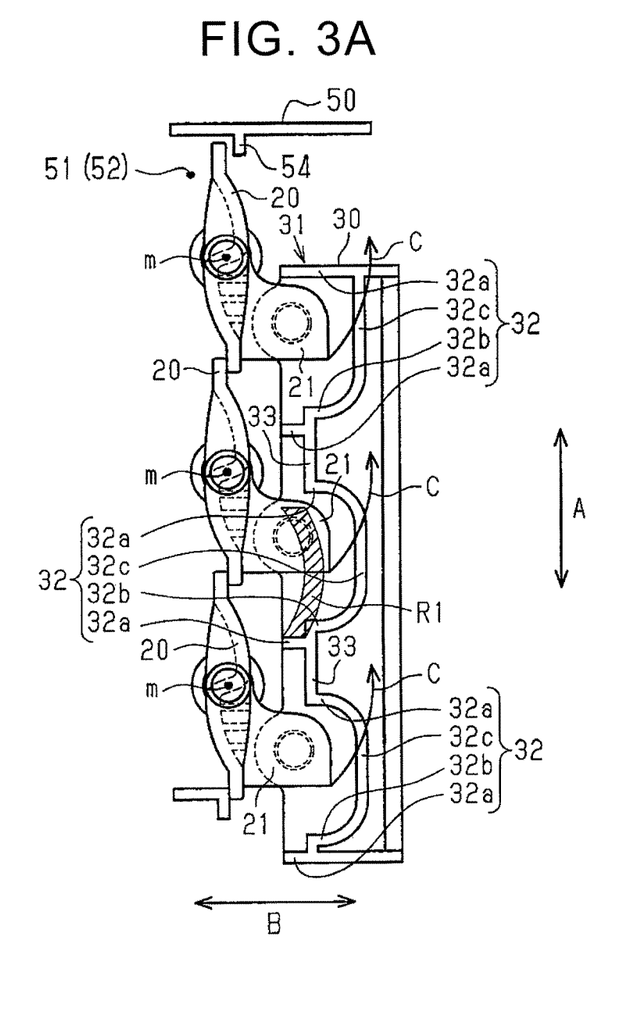
FIG. 3A is an end view showing the positions of fins and a link when the grille shutter device of the first embodiment is in the fully closed state.

As shown in FIG. 3A, when the fins 20 are in the fully closed position, upper and lower ends of the fins 20 vertically adjacent to each other overlap each other to close the openings 51, 52 of the frame 50. In this state, a gap exists between an upper end of the uppermost fin 20 and the upper end portion of the frame 50. However, an upper wall portion 54 is provided on an inner top surface of the frame 50. The upper wall portion 54 is located behind the upper end of the uppermost fin 20. By interference of the upper wall portion 54, entering of the air flowing through the gap into the engine compartment 3 is suppressed. A lower end of the lowermost fin 20 is in abutment with a lower end portion of the frame 50.

Figure 3B:
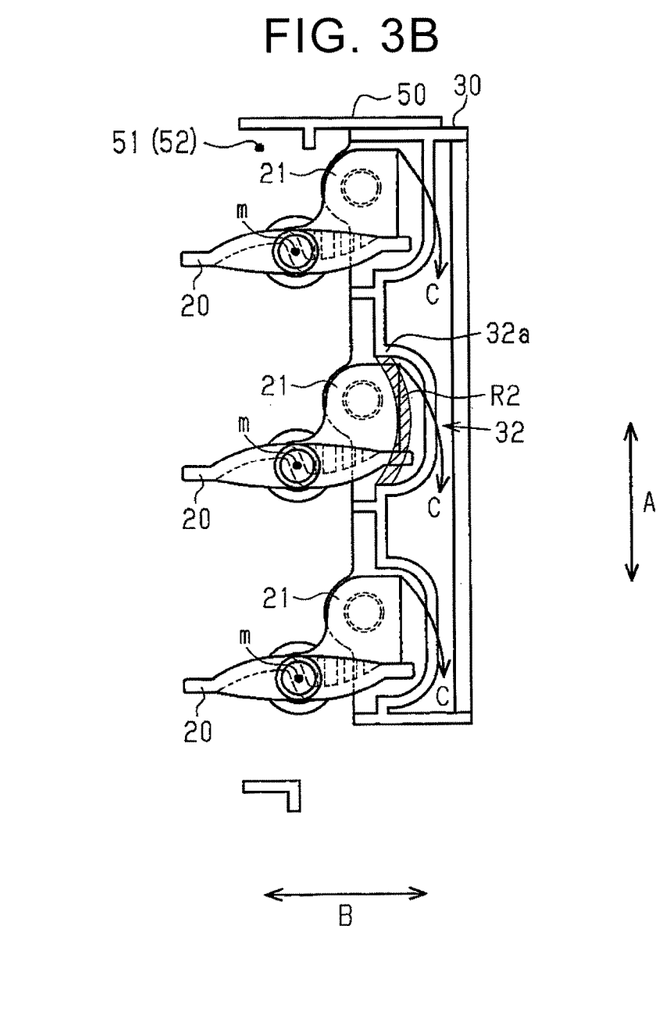
FIG. 3B is an end view showing the positions of the fins and the link when the grille shutter device of the first embodiment is in the fully open state.

As shown in FIG. 3B, when the fins 20 are in the fully open position, the fins 20 vertically adjacent to each other are parallel to each other to open the openings 51, 52 of the frame 50. In this state, by abutment of an upper end portion of the link 30 against the upper end portion of the frame 50, the fins 20 are prevented from turning excessively.

As shown in FIG. 4, a plate-like support portion 21 as a locking portion is provided at an end portion of each fin 20 on the central support portion 53 side of the frame 50. The support portion 21 protrudes in a direction perpendicular to a rear surface (upper surface in FIG. 4) of the fin 20. The central support portion 53 side of the fin 20 is a side of one end out of the two end portions of the fin 20 in the direction in which the axis m of the fin 20 extends.

Figure 2A:
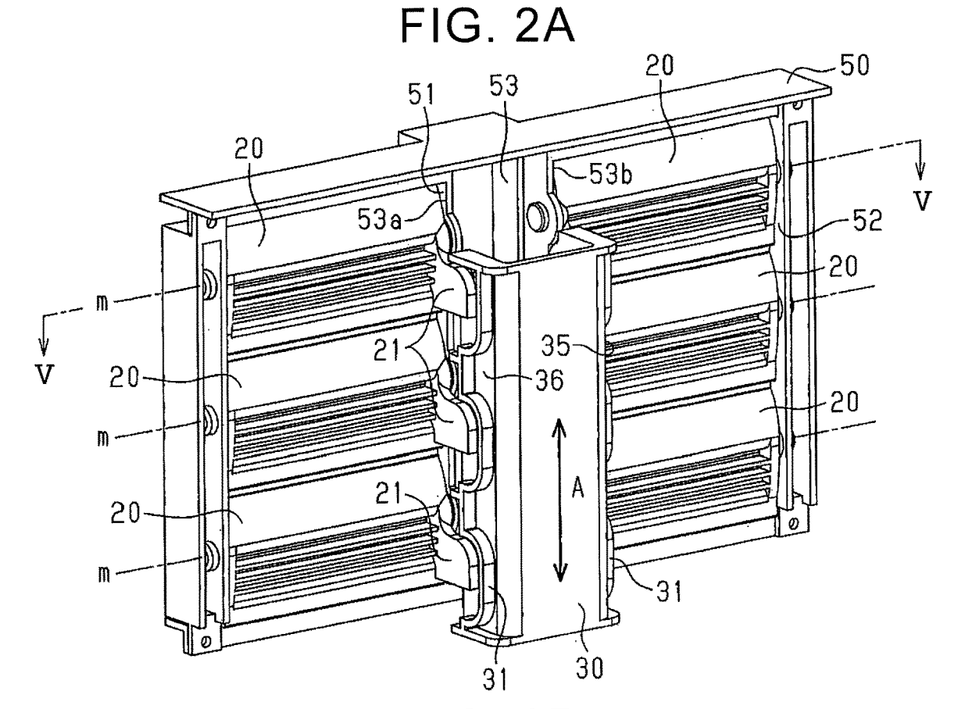
FIG. 2A is a rear perspective view when a grille shutter device of a first embodiment is in a fully closed state.
Figure 2B:
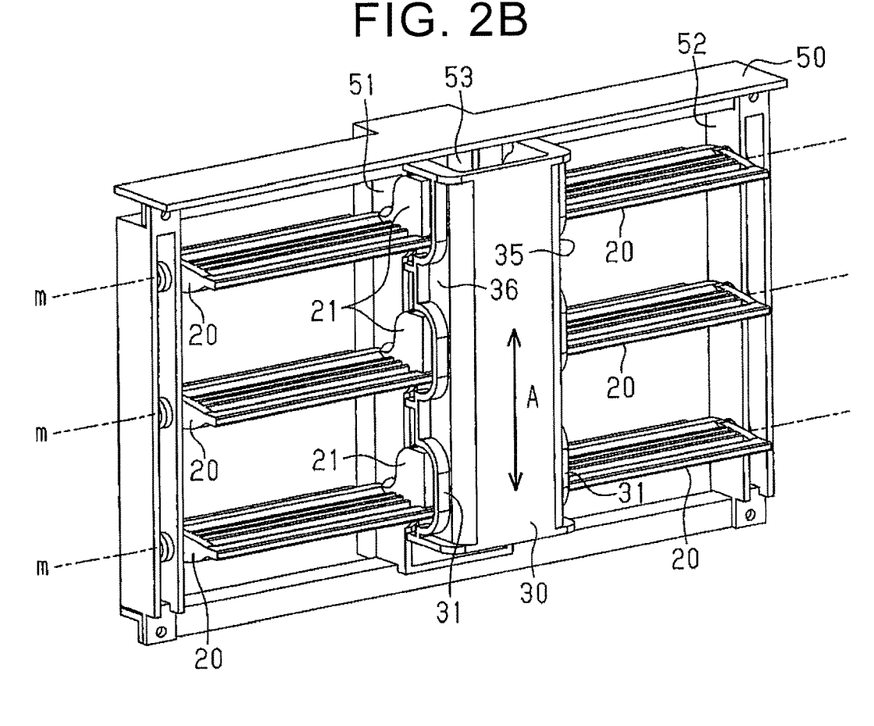
FIG. 2B is a rear perspective view when the grille shutter device of the first embodiment is in a fully open state.

As shown in FIG. 2A, when the fin 20 is in the fully closed position, the support portion 21 extends toward the vehicle rear side. As shown in FIG. 2B, when the fin 20 is in the fully open position, the support portion 21 extends toward the upper end portion of the frame 50 (upward in FIG. 2B).

Figure 5:
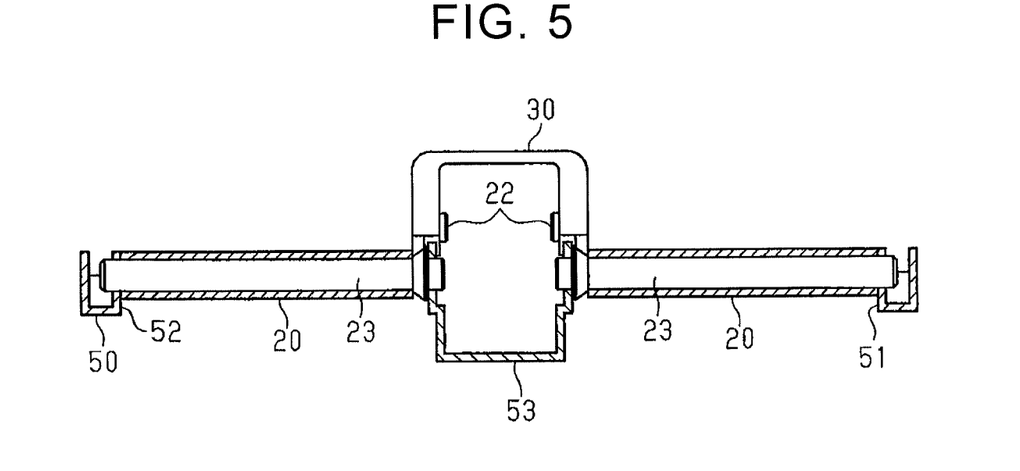
FIG. 5 is a sectional view taken along the line V-V of FIG. 2A.

As shown in FIG. 4, a cylindrical engaging projection 22 is provided on a side surface, on the central support portion 53 side, of the support portion 21 of each fin 20. The engaging projection 22 protrudes in the direction in which the axis m extends. As shown in FIGS. 2A and 5, the link 30 extends in the direction perpendicular to the axes m (vertical direction in FIG. 2A) and has a generally U-shaped end face shape when viewed from the direction perpendicular to the axes m. The link 30 is provided such that its U-shaped opening faces an opening of the central support portion 53 of the frame 50. The link 30 is linked with the fins 20. Specifically, the support portions 21 of the three fins 20 are turnably coupled to a left wall surface 36 (left side surface in FIG. 2A) of the link 30 via the engaging projections 22, while the support portions 21 of the other three fins 20 are turnably coupled to a right wall surface 35 (right side surface in FIG. 2A) of the link 30 via the engaging projections 22.

As shown in FIGS. 2A and 2B, the link 30 is moved in a first direction A (vertical direction in FIG. 2A) being an open/close direction of the fins 20 according to turning of the fins 20.

As shown in FIGS. 3A and 3B, each fin 20 (support portion 21) turns in a third direction C around the axis m. Therefore, the link 30 is moved also in a second direction B (right-left direction in FIG. 3A) being a direction perpendicular to the first direction A according to turning of the fins 20. That is, since the link 30 is moved in the first direction A and also in the second direction B according to turning of the fins 20, the link 30 is apparently moved in an arc shape.

As shown in FIGS. 2A and 2B, the left wall surface 36 and the right wall surface 35 of the link 30 are each provided with a rib projection 31 as a locking portion protruding in the direction in which the axis m extends. The rib projections 31 are provided mirror symmetrically to each other with respect to the link 30.

Hereinafter, the rib projection 31 will be described in detail. Herein, since the rib projections 31 are provided mirror symmetrically, only the rib projection 31 provided on the left wall surface 36 of the link 30 will be described for convenience of description.

As shown in FIG. 3A, the rib projection 31 is provided over the entire length of the link 30 in the first direction A. The rib projection 31 has three projections 32 and two coupling projections 33. The three projections 32 are provided so as to respectively surround the support portions 21 of the fins 20.

The three projections 32 have similar configurations. Each projection 32 has two first portions 32a, a second portion 32b, and a coupling portion 32c. The two first portions 32a are provided along the second direction B. The two first portions 32a are provided so as to interpose the support portion 21 of the corresponding fin 20 therebetween in the first direction A.

When the rib projection 31 is moved together with the link 30 according to turning of the fins 20 in the open direction, the first portion 32a on the lower side of the support portion 21 of each fin 20 is moved on an arc-shaped movement locus R1 (hatched portion in FIG. 3A). The first portion 32a on the lower side of the support portion 21 is provided such that the support portion 21 of the corresponding fin 20 intersects the direction along the movement locus R1. The first portion 32a on the lower side of the support portion 21 is one example of "one of the two first portions".

As shown in FIG. 3B, when the rib projection 31 is moved together with the link 30 according to turning of the fins 20 in the close direction, the first portion 32a on the upper side of the support portion 21 of each fin 20 is moved on an arc-shaped movement locus R2 (hatched portion in FIG. 3B). The first portion 32a on the upper side of the support portion 21 is provided such that the support portion 21 of the corresponding fin 20 intersects the direction along the movement locus R2.

As shown in FIG. 3A, the second portion 32b of each projection 32 extends in a direction intersects the second direction B (more precisely, in the first direction A). The second portion 32b is coupled to the first portion 32a on the lower side of the support portion 21. The second portion 32b is provided such that, like the first portion 32a, when the link 30 is moved according to turning of the fins 20, the support portion 21 of the corresponding fin 20 intersects a movement locus of the second portion 32b.

The coupling portion 32c of each projection 32 couples between an end portion of the first portion 32a provided on the upper side of the support portion 21 and an end portion of the second portion 32b on the side opposite to an end portion of the second portion 32b to which the first portion 32a on the lower side of the support portion 21 is coupled.

The two coupling projections 33 couple the three projections 32 to each other. Specifically, one of the coupling projections 33 couples between the projection 32 corresponding to the uppermost fin 20 and the projection 32 corresponding to the middle fin 20. The other one of the coupling projections 33 couples between the projection 32 corresponding to the middle fin 20 and the projection 32 corresponding to the lowermost fin 20.

As indicated by a broken line in FIG. 4, the actuator 40 is disposed at a position corresponding to the lowermost fins 20 inside the central support portion 53 of the frame 50. The actuator 40 includes a motor. The actuator 40 converts rotation of the motor into rotation of the rotary shafts 23 of the lowermost fins 20. The link 30 is moved due to turning of the lowermost fins 20 caused by the rotation of the rotary shafts 23 so that the uppermost fins 20 and the middle fins 20 turn due to the movement of the link 30. In this way, the fins 20 turn cooperatively with the link 30. The motor serving as a driving source of the actuator 40 rotates based on driving electric power that is supplied by the control unit 60. The actuator 40 includes a pulse sensor.

As shown in FIG. 1, the control unit 60 controls the turning of the fins 20 through supply of driving electric power to the motor of the actuator 40. Specifically, the control unit 60 acquires various vehicle state amounts, such as vehicle speed, coolant temperature of the engine 4, and ambient temperature (outside air temperature), for estimating a vehicle running state. The control unit 60 controls the supply of driving electric power to the motor of the actuator 40 based on those vehicle state amounts. The control unit 60 controls the operation of the fin 20 by setting one of the fully open position and the fully closed position of the fin 20 as an initial position Ps and the other as a control target position Pt. Consequently, the fin 20 is basically held in one of the fully open state and the fully closed state when the turning is stopped. More specifically, the control unit 60 calculates a reference turning amount X0 of the fin 20 that is necessary for the fin 20 to reach the control target position Pt from the initial position Ps (e.g. from the fully closed position to the fully open position), and a turning amount X (turning amount from the initial position Ps) of the fin 20 until the fin 20 comes to a turning stopped state. The control unit 60 calculates a turning amount X in a predetermined cycle based on a pulse signal (pulse interval) that is output from the pulse sensor of the actuator 40. That is, the fin 20 reaches the control target position Pt when the reference turning amount X0 and the turning amount X become the same value.

The control unit 60 includes an abnormality detection unit 61. The abnormality detection unit 61 compares the turning amount X with the reference turning amount X0 to determine whether or not the fin 20 has come to a stopped state before reaching the control target position Pt. When the turning amount X is less than the reference turning amount X0, the abnormality detection unit 61 determines that the fin 20 has not reached the control target position Pt, and detects that the fin 20 has come to the stopped state on the way. As a state of the fin 20 in which the fin 20 stops on the way, there can be cited, for example, fixation of the fin 20 due to freezing or pinching of foreign matter by the fin 20. When the fin 20 is stopped on the way due to the phenomenon described above, the driving of the motor of the actuator 40 driving the lowermost fins 20 is restricted. Consequently, the pulse signal from the pulse sensor of the actuator 40 changes so that the turning amount X calculated by the control unit 60 becomes less than the reference turning amount X0. That is, it can be said that a determination of abnormality of the fin 20 by the abnormality detection unit 61 is determined based on the operating state of the actuator 40. Therefore, the abnormality detection unit 61 detects an abnormality of the fin 20 based on the operating state (driving state of the motor and change in pulse signal of the pulse sensor) of the actuator 40.

Next, an abnormality that occurs on the fin 20 and the operation and effect of the grille shutter device 10 will be described in detail. For convenience of description, a description will be given, as one example, of a case where an abnormality has occurred on the middle fin 20.

Figure 6A:
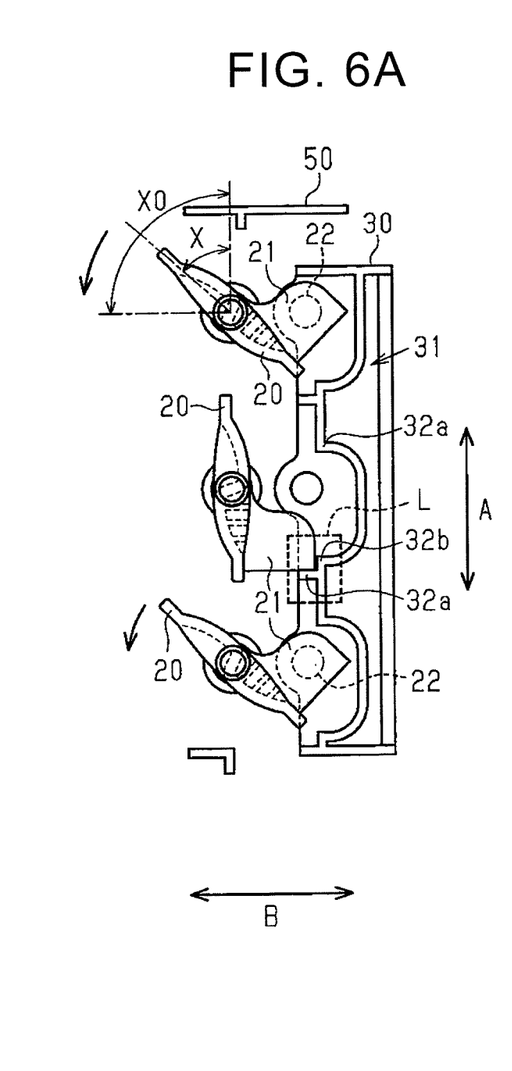
FIG. 6A is an end view showing a state in which the movements of the fins and the link are restricted when the grille shutter device of the first embodiment is in the fully closed state.

When the fins 20 are in the fully closed position (see FIG. 3A), there are cases where an abnormality occurs such that the middle fin 20 is fixed to the frame 50. As shown in FIG. 6A, in this event, when an attempt is made to turn the fins 20 in the open direction (left-downward arrow direction in FIG. 6A) by the actuator 40, there is a possibility that the turning of the fins 20 is restricted due to the fixation of the middle fin 20. When the actuator 40 continues to turn the lowermost fin 20 in this state, it is expected that the engagement between the engaging projection 22 of the middle fin 20 and the link 30 is released or the engaging projection 22 of the middle fin 20 is broken so that motive power transmission between the middle fin 20 and the link 30 is cut off. That is, although the lowermost fin 20, the uppermost fin 20, and the link 30 are linked together, the middle fin 20 is in a non-turnable state.

When an attempt is made to turn the fins 20 in the open direction in this state, the lowermost fin 20 and the uppermost fin 20 turn in the open direction and the link 30 is moved upward in an arc shape, so that a locking structure L is formed where the first portion 32a on the lower side of the support portion 21 of the middle fin 20 and the second portion 32b abut against the support portion 21 of the middle fin 20 that is in the fully closed position. That is, the support portion 21 of the middle fin 20 abuts against the first portion 32a on the lower side of the support portion 21 along the first direction A and against the second portion 32b of the rib projection 31 along the second direction B. Consequently, the movement of the link 30 in the first direction A (upward in FIG. 6A) is restricted. That is, the driving of the motor of the actuator 40 is restricted due to the restriction of the movement of the fins 20 and the link 30. As a result, the abnormality detection unit 61 of the control unit 60 can properly detect an abnormality of the fin 20 by determining that the turning amount X calculated based on the pulse signal from the pulse sensor of the actuator 40 is less than the reference turning amount X0.

Herein, it is expected that the fixation of the middle fin 20 is released due to the abutment of the support portion 21 of the middle fin 20 against the first portion 32a on the lower side of the support portion 21, so that the middle fin 20 becomes turnable. In this event, since the support portion 21 of the middle fin 20 is pushed up (upward in FIG. 6A) by the first portion 32a on the lower side of the support portion 21, the middle fin 20 turns. Consequently, it is not possible to restrict the movement of the fins 20 and the link 30 by the abutment between the support portion 21 of the middle fin 20 and the first portion 32a on the lower side of the support portion 21. However, since the support portion 21 of the middle fin 20 abuts against the second portion 32b along the second direction B, the turning of the middle fin 20 in the open direction is restricted. Therefore, an abnormality of the fin 20 can be detected more properly.

Figure 6B:
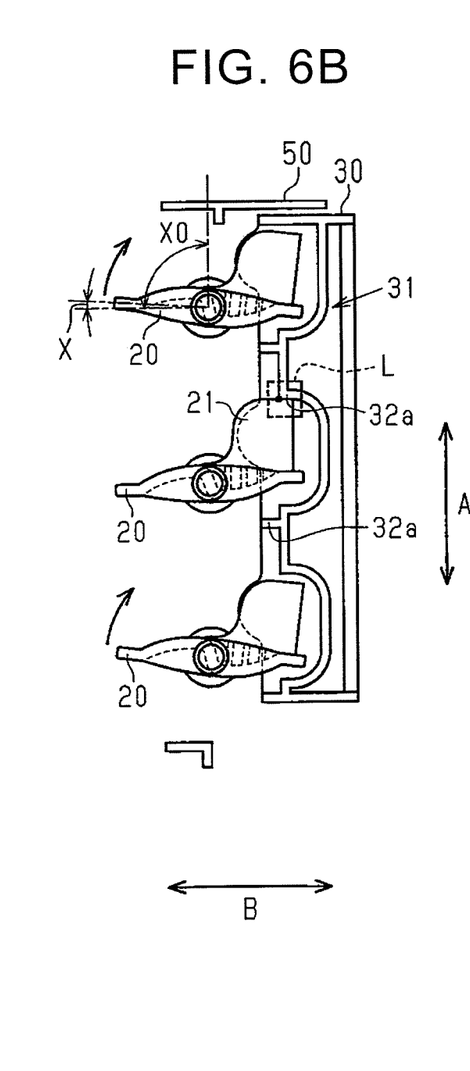
FIG. 6B is an end view showing a state in which the movements of the fins and the link are restricted when the grille shutter device of the first embodiment is in the fully open state.

Next, as shown in FIG. 6B, when the fins 20 are in the fully open position, it is expected that, similarly to the above, motive power transmission between the middle fin 20 and the link 30 is cut off due to fixation of the middle fin 20 to the frame 50. That is, the lowermost fin 20, the uppermost fin 20, and the link 30 are linked together while the middle fin 20 is in a non-turnable state.

When an attempt is made to turn the fins 20 in the close direction in this state, the lowermost fin 20 and the uppermost fin 20 turn in the close direction (right-upward arrow direction in FIG. 6B) and the link 30 is moved downward in an arc shape, so that a locking structure L is formed by abutment of the first portion 32a on the upper side of the support portion 21 against the support portion 21 of the middle fin 20 along the first direction A. Consequently, the movements of the link 30 in the first direction A (downward in FIG. 6B) are restricted. That is, the driving of the motor of the actuator 40 is restricted due to the restriction of the movement of the fins 20 and the link 30. As a result, the abnormality detection unit 61 of the control unit 60 can properly detect an abnormality of the fin 20 by determining that the turning amount X calculated based on the pulse signal from the pulse sensor of the actuator 40 is less than the reference turning amount X0.

Herein, it is expected that the fixation of the middle fin 20 is released due to the abutment of the support portion 21 of the middle fin 20 against the first portion 32a on the upper side of the support portion 21, so that the middle fin 20 becomes turnable. In this event, since the support portion 21 of the middle fin 20 is pushed down (downward in FIG. 6B) by the first portion 32a on the upper side of the support portion 21, the middle fin 20 turns. As a result, the middle fin 20 once returns to the position of the fully closed state, but when turning the fins 20 toward the fully open position again, the following phenomenon may occur.

Figure 6C:
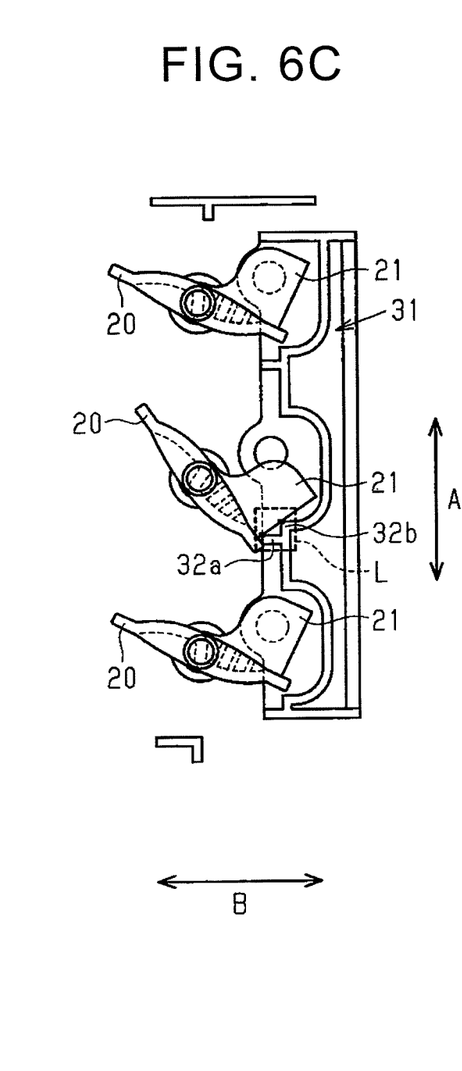
FIG. 6C is an end view showing an example in which the movements of the fins and the link are restricted in the first embodiment.

As shown in FIG. 6C, the support portion 21 of the middle fin 20 forms a locking structure L by abutting against the edge portion of the first portion 32a on the lower side of the support portion 21 along the second direction B and against the edge portion of the second portion 32b along the first direction A. In this event, since the support portion 21 of the middle fin 20 is pushed up by the second portion 32b along the first direction A, the middle fin 20 attempts to turn again, but since the support portion 21 of the middle fin 20 abuts against the first portion 32a on the lower side of the support portion 21 along the second direction B, the turning of the middle fin 20 is restricted. That is, since the first portion 32a on the lower side of the support portion 21 of the middle fin 20 and the second portion 32b cooperatively abut against the support portion 21 of the middle fin 20, the movement of the link 30 in the first direction A and the second direction B is restricted. Therefore, an abnormality of the fin 20 can be detected more properly.

The description has been given of the case where the abnormality has occurred on the middle fin 20, but not limited thereto. For example, the same operation and effect can also be expected in the case of the uppermost fin 20 or the lowermost fin 20.

In this embodiment, even when one of the fins 20 is fixed and motive power transmission between the fin 20 and the link 30 is not cut off due to the fixation of the fin 20, the movements of all the fins 20 and the link 30 are restricted due to the fixation of the fin 20. As a result, the driving of the motor of the actuator 40 is restricted. That is, even in the state where motive power transmission between the fin 20 and the link 30 is not cut off due to the fixation of the fin 20, it is also possible to detect an abnormality of the fin 20.

As shown in FIGS. 1 and 2A, when the fins 20 are in the fully closed position, it is expected that gaps due to dimensional tolerance or the like are formed between the fins 20 and the left wall portion 53a and the right wall portion 53b of the central support portion 53 of the frame 50. Therefore, even when the fins 20 are in the fully closed state, there is a possibility that the air passing through the air introduction path R may pass through those gaps.

In this regard, the rib projections 31 are each provided to extend over the entire length of the link 30 in the first direction A and to surround the support portions 21 of the fins 20. Therefore, even when the air has passed through the gaps between the fins 20 and the central support portion 53 of the frame 50, the rib projections 31 of the link 30 each function as a wall portion to block the flow of the air. Accordingly, it is possible to improve the airtightness in the engine compartment 3 when the fins 20 are in the fully closed state.

There is a possibility that water enters the inside of the vehicle body 2. It is expected that the water having entered flows from the upper end portion side toward the lower end portion side of the frame 50 of the grille shutter device 10. In this regard, since the rib projections 31 are provided to surround the support portions 21 of the fins 20, it is possible to suppress adhesion of the entered water between the support portions 21 of the fins 20 and the left wall surface 36 and the right wall surface 35 of the link 30. Therefore, it is possible to suppress fixation of the fins 20 to the link 30 due to freezing.

Second Embodiment

Hereinafter, a second embodiment of a grille shutter device will be described. The second embodiment differs from the first embodiment mainly in that the locking structure L between the fin 20 and the link 30 is changed. The same configurations as those of the first embodiment are assigned the same symbols, thereby omitting detailed description thereof.

Figure 7A:
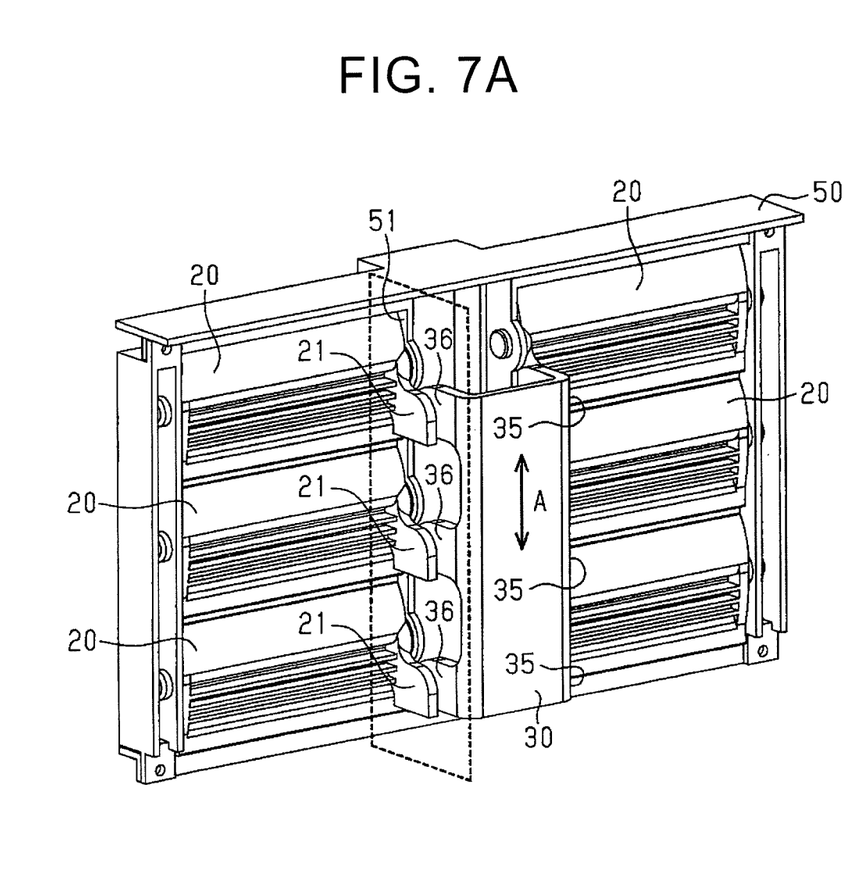
FIG. 7A is a rear perspective view when a grille shutter device of a second embodiment is in a fully closed state.
Figure 7B:
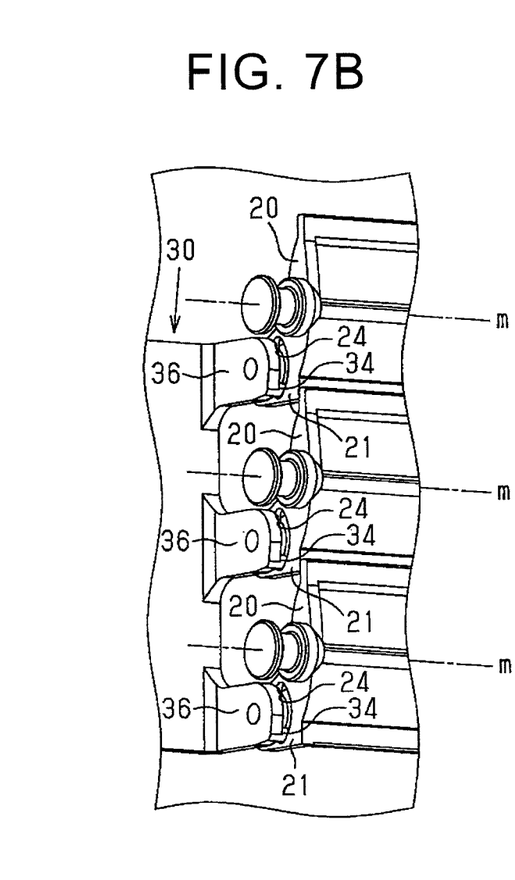
FIG. 7B is a schematic diagram showing a locking structure in the second embodiment surrounded by a broken line in FIG. 7A.

As shown in FIG. 7A, left wall surfaces 36 and right wall surfaces 35 of the link 30 are respectively provided only at portions corresponding to the support portions 21 of the fins 20. As shown in FIG. 7B, the left wall surfaces 36 of the link 30 are each provided with a projecting portion 34 as a locking portion protruding to the fin 20 side in the direction in which the axis m extends. Projecting portions 34 provided to the right wall surfaces 35 are provided mirror symmetrically to the projecting portions 34 provided to the left wall surfaces 36 (illustration omitted).

The support portions 21 of the fins 20 are each formed with a groove portion 24 as a fitting portion on its surface facing the left wall surface 36 (or the right wall surface 35). The projecting portion 34 is fitted into the groove portion 24. The groove portion 24 is one example of a locking portion of the fin 20.

Figure 8A:
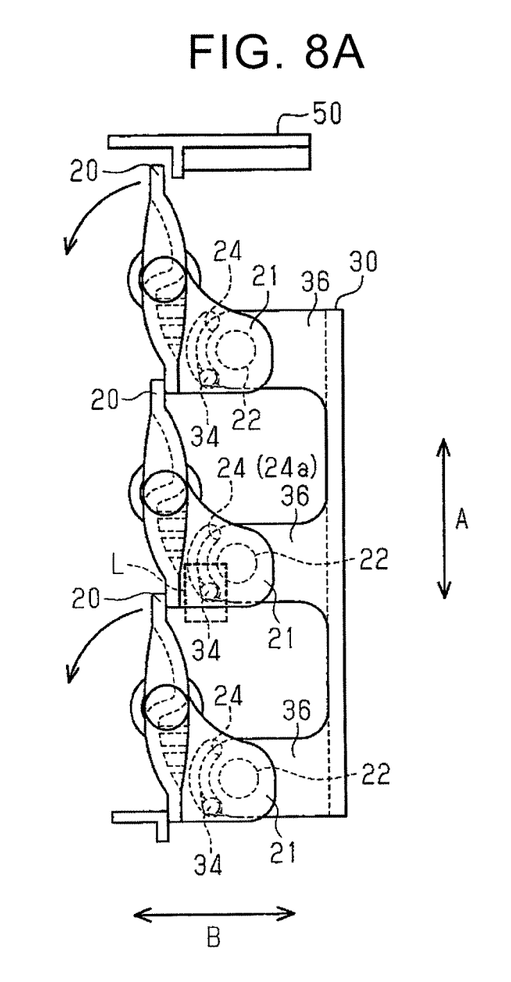
FIG. 8A is an end view showing the positions of fins and a link when the grille shutter device of the second embodiment is in the fully closed state.

As shown in FIG. 8A, the groove portion 24 of the fin 20 has an arc shape. More specifically, the groove portion 24 has an arc shape that is equal in distance from the axis of the engaging projection 22 of the fin 20.

The support portion 21 of the fin 20 and the left wall surface 36 (or the right wall surface 35) of the link 30 rotate relative to each other around the axis of the engaging projection 22. When the support portion 21 rotates relative to the left wall surface 36 of the link 30 according to turning of the fin 20, the projecting portion 34 relatively moves in the groove portion 24.

Figure 8B:
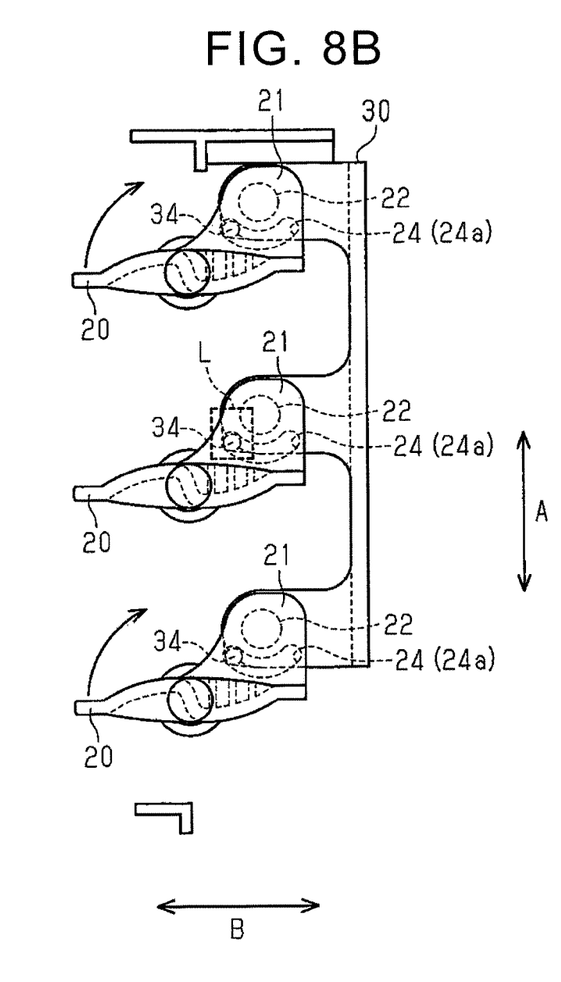
FIG. 8B is an end view showing the positions of the fins and the link when the grille shutter device of the second embodiment is in a fully open state.

When the fins 20 are in the fully closed state, the projecting portions 34 are each in abutment with a first end portion (lower end portion in FIG. 8A) of the groove portion 24. As shown in FIG. 8B, when the fins 20 are in the fully open state, the projecting portions 34 are each in abutment with a second end portion (left end portion in FIG. 8B) of the groove portion 24. By the abutment of the projecting portion 34 against the second end portion of the groove portion 24, the fin 20 is prevented from turning excessively in the open direction.

Next, an abnormality that occurs on the fin 20 and the operation and effect of the grille shutter device 10 will be described in detail. For convenience of description, a description will be given, as one example, of a case where an abnormality has occurred on the middle fin 20.

As shown in FIG. 8A, when the fins 20 are in the fully closed position, it is expected that, like in the first embodiment, motive power transmission between the middle fin 20 and the link 30 is cut off due to an abnormality such that the middle fin 20 is fixed to the frame 50. That is, although the lowermost fin 20, the uppermost fin 20, and the link 30 are linked together, the middle fin 20 is in a non-turnable state.

When an attempt is made to turn the fins 20 in the open direction in this state, the lowermost fin 20 and the uppermost fin 20 turn in the open direction and the link 30 is moved upward in an arc shape, so that a locking structure L is formed by abutment of the projecting portion 34 of the link 30 against an inner wall 24a (right upper side in FIG. 8A) of the groove portion 24 in the support portion 21 of the middle fin 20. This is because since the middle fin 20 is in the non-turnable state, the position of the groove portion 24 does not change so that the projecting portion 34 cannot relatively move in the groove portion 24 smoothly. Even with this configuration, like in the first embodiment, it is possible to properly detect an abnormality of the fin 20.

As shown in FIG. 8B, when the fins 20 are in the fully open position, it is expected that, similarly to the above, motive power transmission between the middle fin 20 and the link 30 is cut off. That is, although the lowermost fin 20, the uppermost fin 20, and the link 30 are linked together, the middle fin 20 is in a non-turnable state.

When an attempt is made to turn the fins 20 in the close direction in this state, the lowermost fin 20 and the uppermost fin 20 turn in the close direction and the link 30 is moved downward in an arc shape, so that a locking structure L is formed by abutment of the projecting portion 34 of the link 30 against an inner wall 24a (left lower side in FIG. 8B) of the groove portion 24 in the support portion 21 of the middle fin 20. Even with this configuration, like in the first embodiment, it is possible to properly detect an abnormality of the fin 20.

The description has been given of the case where the abnormality has occurred on the middle fin 20, but not limited thereto. For example, the same operation and effect can also be expected in the case of the uppermost fin 20 or the lowermost fin 20.

The first embodiment and the second embodiment may be changed as follows within a range where no technical contradiction occurs.

In the second embodiment, the groove portion 24 is employed as the fitting portion. However, for example, it may alternatively be a hole portion passing through the support portion 21 of the fin 20 in the thickness direction. Even with this configuration, the same effect as in the second embodiment is obtained.

In the second embodiment, the groove portion 24 is provided on the support portion 21 of the fin 20, and the projecting portion 34 is provided on the left wall surface 36 (or the right wall surface 35) of the link 30. However, for example, the configuration may be reversed. Even with this configuration, the same effect as in the second embodiment is obtained.

In the first embodiment, the first portion 32a of the rib projection 31 abuts against the support portion 21 of the middle fin 20 in the first direction A, and the second portion 32b of the rib projection 31 abuts against the support portion 21 of the middle fin 20 in the second direction B, but not limited thereto. On the premise that the fixation of the middle fin 20 is not released by the abutment of the middle fin 20 against the rib projection 31, it may be configured that, for example, only the first portion 32a of the rib projection 31 abuts against the support portion 21 of the middle fin 20 in the first direction A. Alternatively, for example, it may be configured that only the second portion 32b of the rib projection 31 abuts against the support portion 21 of the middle fin 20 in the first direction A. Even with this configuration, it is possible to properly detect an abnormality of the fin 20.

In the first embodiment, it is possible to directly detect fixation of the lowermost fin 20 even if the support portion 21 of the lowermost fin 20 does not abut against the rib projection 31. Therefore, the projection 32 corresponding to the lowermost fin 20 may be omitted in the rib projection 31.

In the first and second embodiments, the lowermost fin 20 is turned by the actuator 40. However, it may be configured that the uppermost fin 20 or the middle fin 20 may be turned by the actuator 40. For example, when it is configured that the middle fin 20 is turned by the actuator 40, the configuration of the projections 32 corresponding to the uppermost fin 20 and the lowermost fin 20 may be employed as it is, while the projection 32 corresponding to the middle fin 20 may be omitted. Following this, the two coupling projections 33 may also be omitted.

Figure 9A:
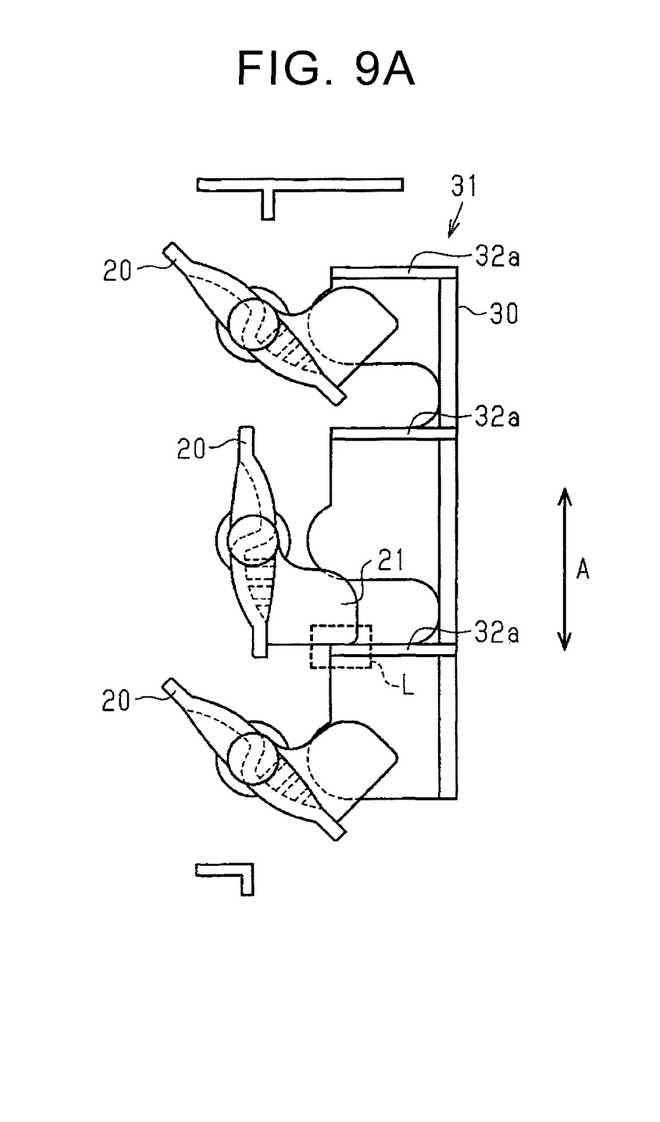
FIG. 9A is an end view showing a state in which the movements of fins and a link are restricted when a grille shutter device of a modification is in a fully closed state.
Figure 9B:
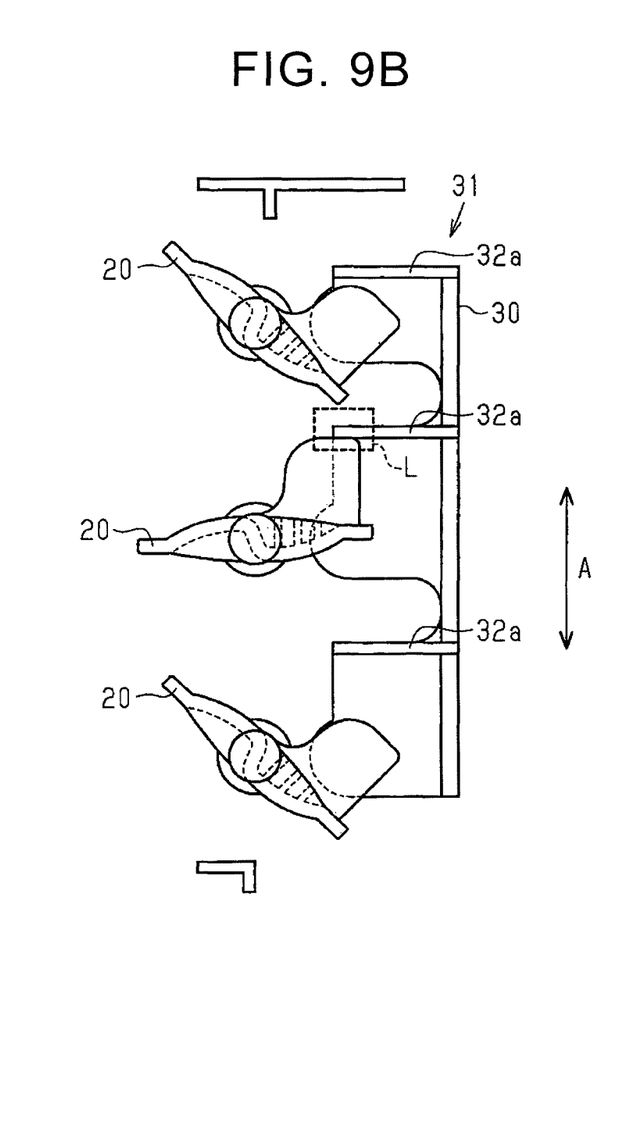
FIG. 9B is an end view showing a state in which the movements of the fins and the link are restricted when the grille shutter device of the modification is in a fully open state.

In the first embodiment, the rib projection 31 includes the projections 32 each having the two first portions 32a, the second portion 32b, and the coupling portion 32c. However, the rib projection 31 may be changed as follows. As shown in FIGS. 9A and 9B, the rib projection 31 may be composed of only the first portions 32a.

Even with this configuration, as shown in FIG. 9A, for example, even when the middle fin 20 is fixed in the fully closed position and then motive power transmission between the middle fin 20 and the link 30 is cut off, the support portion 21 of the middle fin 20 abuts against the first portion 32a on the lower side of the support portion 21. As shown in FIG. 9B, for example, even when the middle fin 20 is fixed in the fully open position and then motive power transmission between the middle fin 20 and the link 30 is cut off, the support portion 21 of the middle fin 20 abuts against the first portion 32a on the upper side of the support portion 21. Therefore, since the movement of the link 30 in the first direction A is restricted by a locking structure L formed by the middle fin 20 and the rib projection 31 of the link 30, the movements of the fins 20 and the link 30 are restricted. Accordingly, it is possible to properly detect an abnormality of the fin 20.

The rib projection 31 may be composed of only the second portions 32b. In this case, the second portion 32b of the rib projection 31 may abut against the support portion 21 of the fin 20 along the first direction A, or the second portion 32b of the rib projection 31 may abut against the support portion 21 of the fin 20 along the second direction B, which may be changed as appropriate.

In the first and second embodiments, the abnormality detection unit 61 detects an abnormality of the fin 20 by detecting a turning position deviation of the fin 20 based on a comparison between the turning amount X and the reference turning amount X0, but not limited thereto. For example, it may be configured that an abnormality of the fin 20 is detected when the current value upon restriction of the driving of the motor of the actuator 40 is greater than a predetermined value set in advance. For example, the current value, that flows through the motor of the actuator 40 when the driving of the motor of the actuator 40 is restricted due to abutment of the lowermost fin 20 against the lower end portion of the frame 50 in the case where the fins 20 are in the fully closed position, may be set as the predetermined value. Alternatively, the current value, that flows through the motor of the actuator 40 when the driving of the motor of the actuator 40 is restricted due to abutment of the upper end portion of the link 30 against the upper end portion of the frame 50 in the case where the fins 20 are in the fully open position, may be set as the predetermined value.

In the first and second embodiments, the grille shutter device 10 opens and closes the air introduction path R by opening and closing the fins 20 in the vertical direction of the vehicle 1 (vehicle height direction), but not limited thereto. For example, the fins 20 may be opened and closed in the right-left direction (vehicle width direction).

In the first and second embodiments, the fins 20 are set to be in the fully open position when the link 30 is moved upward in the first direction A, and are set to be in the fully closed position when the link 30 is moved downward in the first direction A, but not limited thereto. For example, the movement direction of the link 30 and the open/close position of the fins 20 may be reversed.

In this case, for example, in the first embodiment, the support portions 21 of the fins 20 are set to extend toward the vehicle rear side when the fins 20 are in the fully closed position, and are set to extend toward the lower end portion of the frame 50 when the fins 20 are in the fully open position. Following this, the configuration is changed such that, in each of the projections 32 of the rib projection 31, the second portion 32b coupled to the first portion 32a on the lower side of the support portion 21 is coupled to the first portion 32a on the upper side of the support portion 21.

In the first and second embodiments, the fins 20 have the plate shape. However, the shape may be changed as appropriate as long as it can open and close the air introduction path R. In the first and second embodiments, the engaging projections 22 are provided to the support portions 21 of the fins 20. However, the engaging projections 22 may alternatively be provided to the left wall surface 36 and the right wall surface 35 of the link 30. In this case, the support portions 21 are respectively formed with hole portions for engagement with the engaging projections 22 of the link 30.

In the grille shutter device according to the disclosure, each of the fins may be turnable around an axis crossing the air introduction path and the fins may be arranged in parallel to each other along a direction perpendicular to the axis; the first locking portion may be a support portion provided at one of two end portions of each of the fins in a direction in which the axis extends, the support portion being turnably coupled to the linkage member; and the second locking portion may be a rib projection provided on the linkage member such that the support portion intersects a movement locus that is formed when the rib projection is moved together with the linkage member according to turning of the fins.

According to the above-described configuration, when motive power transmission between the fin subjected to the abnormality and the linkage member is cut off due to the abnormality such as fixation of the fin, the movements of the fins and the linkage member are restricted due to abutment of the rib projection provided to the linkage member against the support portion of the fin subjected to the abnormality. As a result, the operation of the driving device is restricted so that the abnormality of the fin can be detected by the abnormality detection unit. Therefore, it is possible to detect the abnormality of the fin more properly.

In the grille shutter device according to the disclosure, the linkage member may be configured to be moved in an arc-shaped route by being moved in a first direction along an open or close direction of the fins and being moved also in a second direction perpendicular to the first direction according to turning of the fins; the rib projection may include two first portions that extend along the second direction and are provided so as to interpose the support portion between the two first portions in the first direction; in the power transmission cut-off state, when the abnormal fin is at a position of a fully closed state, the movement of the linkage member may be restricted by an abutment of one of the two first portions against the support portion of the abnormal fin; and in the power transmission cut-off state, when the abnormal fin is at a position of a fully open state, the movement of the linkage member may be restricted by an abutment of the other one of the two first portions against the support portion of the abnormal fin.

Optionally, in the grille shutter device according to the disclosure, the linkage member may be configured to be moved in an arc-shaped route by being moved in a first direction along an open or close direction of the fins and being moved also in a second direction perpendicular to the first direction according to turning of the fins; the rib projection may include two first portions that extend along the second direction and are provided so as to interpose the support portion between the two first portions in the first direction, the rib projection further including a second portion provided so as to intersect the second direction; in the power transmission cut-off state, when the abnormal fin is at a position of a fully closed state, the movement of the linkage member may be restricted by an abutment of at least one of one of the two first portions and the second portion against the support portion of the abnormal fin; and in the power transmission cut-off state, when the abnormal fin is at a position of a fully open state, the movement of the linkage member may be restricted by an abutment of the other one of the two first portions against the support portion of the abnormal fin.

According to the above-described configuration, for example, when motive power transmission between the fin subjected to the abnormality and the linkage member is cut off due to the abnormality, such as fixation of the fin being at the fully closed position, one of the two first portions of the rib projection abuts against the support portion of the fin subjected to the abnormality in the first direction. As a result, the movement of the linkage member is restricted so that the movements of the fins and the linkage member are restricted together.

On the other hand, for example, it is expected that the fixation of the fin is released due to the abutment of one of the two first portions of the rib projection against the support portion of the fin subjected to the abnormality, so that the fin becomes turnable.

In this regard, according to the above-described configuration, even when the fin subjected to the abnormality turns, the support portion of the fin subjected to the abnormality abuts against the second portion of the rib projection in the second direction. Therefore, even when the fin subjected to the abnormality attempts to turn in the state where motive power transmission between the fin subjected to the abnormality and the linkage member is cut off, the turning of the fin subjected to the abnormality is restricted by the second portion of the rib projection. That is, one of the two first portions and the second portion of the rib projection cooperatively abut against the support portion of the fin subjected to the abnormality. As a result, the movements of the fins and the linkage member are restricted.

When motive power transmission between the fin subjected to the abnormality and the linkage member is cut off due to the abnormality such as fixation of the fin being at the fully open position, the other one of the two first portions of the rib projection abuts against the support portion of the fin subjected to the abnormality in the first direction. As a result, the movements of the fins and the linkage member are restricted. Therefore, it is possible to detect the abnormality of the fin more properly.

In the grille shutter device according to the disclosure, the grille shutter device may further include a frame supporting the both end portions of each of the fins in the direction in which the axis extends, so as to allow the fins to be turnable, the frame being fixed inside the vehicle body, wherein the rib projection may be formed over an entire length of the linkage member in a direction along which the fins are arranged in parallel to each other and the rib projection is provided so as to surround the support portion of the fins.

When the fins are turnably supported by the frame, there is a possibility that gaps are formed between the fins and the frame. Therefore, even when the fins are in the fully closed state, there is a possibility that the air passing through the air introduction path may pass through those gaps.

In this regard, according to the above-described configuration, even when the air has passed through the gaps between the fins and the frame, the rib projection, provided along the direction along which the fins are arranged in parallel to each other, of the linkage member functions as a wall portion to block the flow of the air. Therefore, it is possible to improve the airtightness in the engine compartment when the fins are in the fully closed state.

In the grille shutter device according to the disclosure, each of the fins may be turnable around an axis crossing the air introduction path and the fins may be arranged in parallel to each other along a direction perpendicular to the axis; each of the fins may be provided with a support portion at one of two end portions of each of the fins in a direction in which the axis extends, the support portion turnably coupled to the linkage member; the linkage member may be configured to be moved in an arc-shaped route by being moved in a first direction along an open or close direction of the fins and being moved also in a second direction perpendicular to the first direction according to turning of the fins; one of the first locking portion and the second locking portion may be a projecting portion protruding in the direction in which the axis extends; and the other one of the first locking portion and second locking portion may be a fitting portion to which the projecting portion is fitted so as to be movable according to turning of the fins.

According to the above-described configuration, when an attempt is made to turn the fins in the state where the fins cannot turn due to the abnormality such as fixation of the fin and where motive power transmission between the fin subjected to the abnormality and the linkage member is cut off, the movements of the fins and the linkage member are restricted due to abutment of the projecting portion against the inner wall of the fitting portion. As a result, the operation of the driving device is restricted so that the abnormality of the fin can be detected by the abnormality detection unit. Therefore, it is possible to detect the abnormality of the fin more properly.

What is claimed is:

1. A grille shutter device comprising:
    a plurality of fins configured to open and close an air introduction path which is configured to introduce air into an engine compartment of a vehicle body;
    a linkage member configured to link the fins such that the fins move together;
    a driving device configured to move one of the fins to open and close the air introduction path;
    an abnormality detector configured to detect an abnormality of at least one fin of the plurality of fins according to an operating state of the driving device; and
    a locking structure including a first locking portion being a part of each of the fins and a second locking portion being a part of the linkage member, wherein:
    in a motive power transmission cut-off state, a movement of the linkage member is restricted by an abutment of the second locking portion against a first locking portion of an abnormal fin;
    the motive power transmission cut-off state is a state where motive power transmission between the abnormal fin and the linkage member is cut off due to abnormality which occurs on the at least one fin; and
    the abnormal fin is the at least one fin on which the abnormality occurs,
    wherein each of the fins is turnable around an axis crossing the air introduction path and the fins are arranged in parallel to each other along a direction perpendicular to the axis;
    the first locking portion is a support portion provided at one of two end portions of each of the fins in a direction in which the axis extends, the support portion being turnably coupled to the linkage member; and
    the second locking portion is a rib projection provided on the linkage member such that the support portion intersects a movement locus that is formed when the rib projection is moved together with the linkage member according to turning of the fins, and
    wherein the linkage member is configured to be moved in an arc-shaped route by being moved in a first direction along an open or close direction of the fins and being moved also in a second direction perpendicular to the first direction according to turning of the fins;
    the rib projection includes two first portions that extend along the second direction and are provided so as to interpose the support portion between the two first portions in the first direction;
    in the power transmission cut-off state, when the abnormal fin is at a position of a fully closed state, the movement of the linkage member is restricted by an abutment of one of the two first portions against the support portion of the abnormal fin; and
    in the power transmission cut-off state, when the abnormal fin is at a position of a fully open state, the movement of the linkage member is restricted by an abutment of the other one of the two first portions against the support portion of the abnormal fin.

2. The grille shutter device according to claim 1, wherein:
    the linkage member is configured to be moved in an arc-shaped route by being moved in a first direction along an open or close direction of the fins and being moved also in a second direction perpendicular to the first direction according to turning of the fins;
    the rib projection includes two first portions that extend along the second direction and are provided so as to interpose the support portion between the two first portions in the first direction, the rib projection further including a second portion provided so as to intersect the second direction;
    in the power transmission cut-off state, when the abnormal fin is at a position of a fully closed state, the movement of the linkage member is restricted by an abutment of at least one of one of the two first portions and the second portion against the support portion of the abnormal fin; and
    in the power transmission cut-off state, when the abnormal fin is at a position of a fully open state, the movement of the linkage member is restricted by an abutment of the other one of the two first portions against the support portion of the abnormal fin.

3. The grille shutter device according to claim 1, further comprising a frame supporting the both end portions of each of the fins in the direction in which the axis extends, so as to allow the fins to be turnable, the frame being fixed inside the vehicle body, wherein the rib projection is formed over an entire length of the linkage member in a direction along which the fins are arranged in parallel to each other and the rib projection is provided so as to surround the support portion of the fins.

4. The grille shutter device according to claim 1, wherein:
    each of the fins is turnable around an axis crossing the air introduction path and the fins are arranged in parallel to each other along a direction perpendicular to the axis;
    each of the fins is provided with a support portion at one of two end portions of each of the fins in a direction in which the axis extends, the support portion turnably coupled to the linkage member;
    the linkage member is configured to be moved in an arc-shaped route by being moved in a first direction along an open or close direction of the fins and being moved also in a second direction perpendicular to the first direction according to turning of the fins;
    one of the first locking portion and the second locking portion is a projecting portion protruding in the direction in which the axis extends; and
    the other one of the first locking portion and second locking portion is a fitting portion to which the projecting portion is fitted so as to be movable according to turning of the fins.

* * * * *